May 14, 1963 P. L. GLOCKER 3,089,613
METHOD AND DEVICE FOR CHARGING A WORKPIECE HOLDER
Filed April 4, 1960
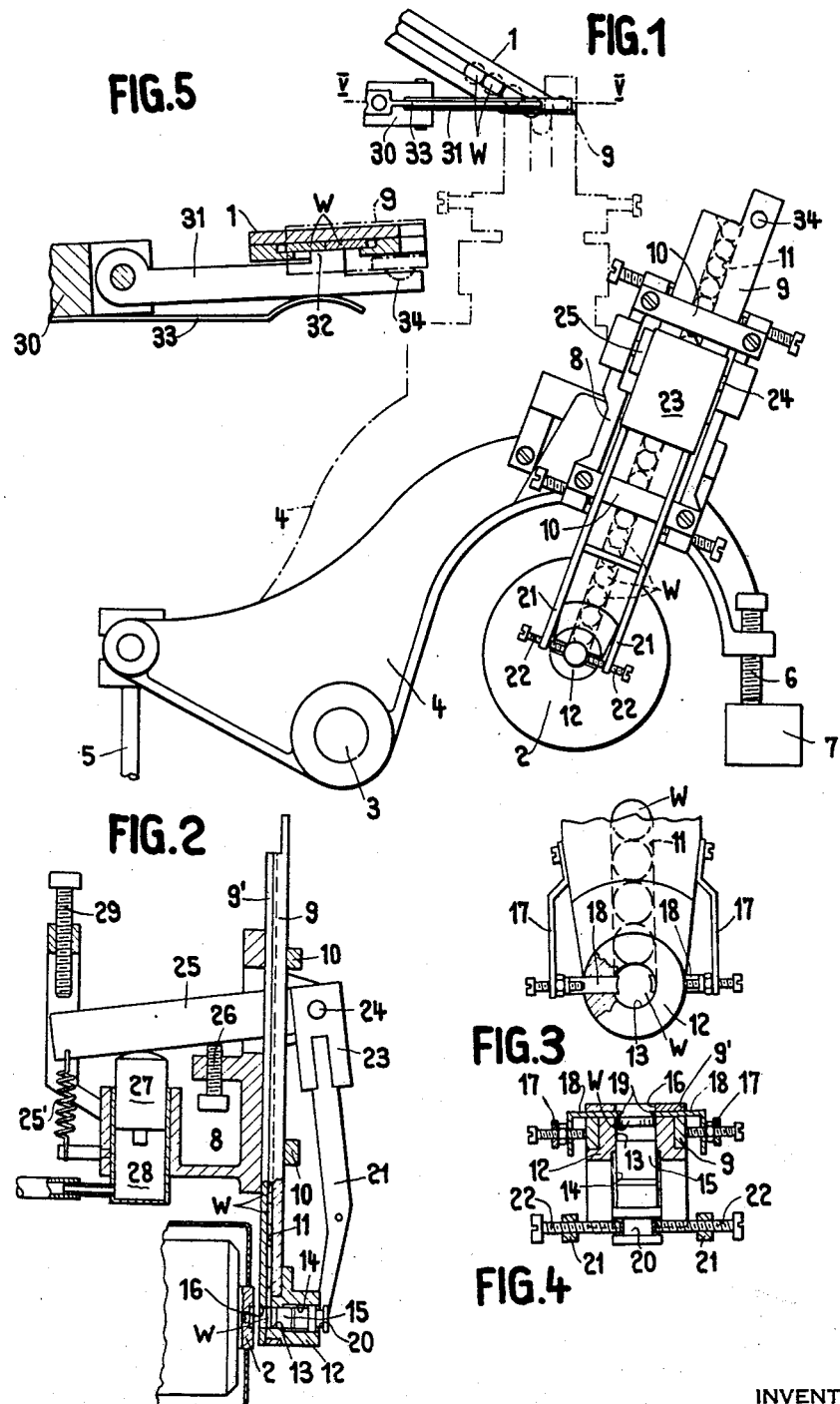
INVENTOR
Paul L. Glocker
BY
ATTORNEYS

3,089,613
METHOD AND DEVICE FOR CHARGING A WORKPIECE HOLDER

Paul L. Glocker, Jurastrasse 88, Grenchen, Switzerland
Filed Apr. 4, 1960, Ser. No. 19,660
Claims priority, application Switzerland Apr. 10, 1959
7 Claims. (Cl. 221—176)

This invention relates to a method and device for charging a workpiece holder, for instance a chuck or any other clamping tool, with a workpiece taken from a movable magazine.

For charging chucks or the like elements of machine tools, swinging arms or displaceable slides have hitherto been used for taking individual workpieces from the magazine, for radially advancing such workpieces into the working axis, that is the axis of the chuck or the like, and to insert the workpiece into the chuck by subsequent relative axial displacement between the charging member and the chuck. Therefore, displacements in two substantially perpendicular directions have been required in any case for transporting the workpiece from the magazine into the workpiece holder, for first radially advancing the workpiece into the working axis and subsequently axially shifting it into its working position. It is evident that in this case the charging member has to be equipped with suitable clamping means or recesses for properly supporting the workpiece during its transport from the magazine to the workpiece holder.

It has also been proposed to provide a swingable magazine from which a workpiece is ejected into a separate clamping structure during every backward stroke of the magazine. During the forward stroke of the magazine the clamping structure which is displaceable with the magazine and laterally extends from the magazine is advanced into the axis of a chuck and the workpiece is subsequently removed from the clamping structure by axial advance closure and retraction of the chuck. It is seen that this known system still requires clamping and charging means separate from the magazine so that the device is complicated in structure and slow and unreliable in operation.

It is a primary object of this invention to simplify the charging device and charging method by non-positively displacing workpieces to the magazine outlet for instance by gravity forces, pneumatic action or the like, and simultaneously discharging individual workpieces from the said magazine outlet and inserting them into the said workpiece holder by one single movement. The fact that the ejecting movement is identified with the charging movement of the workpiece directly into its radially and axially correct working position in the workpiece holder allows appreciable simplification in operational and constructive respect in that the magazine which is a part required in any case has only to be equipped with ejecting means. The charging device according to this invention is broadly characterized by a movable, for instance a swingable magazine having an inlet and outlet, the magazine being adapted for automatic displacement of workpieces from its inlet to its outlet, for instance by gravity, means for displacing the said magazine to a charging position wherein its outlet directly faces the workpiece holder, and means displaceable with the said magazine for simultaneously ejecting a workpiece from the magazine output and inserting it into the workpiece holder.

Further objects and advantages of the invention will be apparent from the following description and the attached drawings showing, by way of example only, a preferred embodiment of the invention and wherein FIG. 1 is a side view of the charging device in its charging position in front of a chuck, FIG. 2 is a longitudinal section of the charging device, FIG. 3 is a front view of the magazine outlet with the ejecting mechanism removed, FIG. 4 is a horizontal section of the magazine outlet and FIG. 5 is a partial section along line V—V in FIG. 1 on a larger scale.

The illustrated charging device serves for transporting workpieces from the output of a conveyor of conventional construction and wherefrom FIG. 1 only shows the output canal 1, into the chuck 2 of a machine tool (FIG. 2). The charging device has a double-armed curved lever or carrier 4 mounted on a pivot pin 3, the curved carrier embracing the working place of the machine. An actuating rod 5 is attached to the left end (FIG. 1) of carrier 4, and a stop bolt 6 is screwed into the right end of carrier 1 (FIG. 1), this stop bolt cooperating with a fixed stop 7 of the machine for precisely limiting the clockwise displacement of carrier 4.

Carrier 4 has a laterally extending mounting base 8 (FIG. 2) to which a flat magazine 9 is removably clamped by means of yokes 10. The canal 11 of the magazine 9 is so designed that flat workpieces W will pile up in a straight row, that is, the cross section of the magazine canal 11 is closely adapted to the shape of the workpieces so that such workpieces will fall through the canal with little clearance. A body 12 forming a magazine outlet is fixed at the lower end of magazine 9, whereby the lower end of canal 11 opens into a longitudinal or axial bore of body 12. A front-portion 13 of the bore of body 12 into which the canal 11 opens has a somewhat smaller diameter than a rear portion 14 of the bore wherein a substantially cylindrical ejector is axially displaceable. A front portion 15 of the ejector is preferably connected to the rear portion of the ejector by means of a ball bearing or the like so that the front portion 15 of the ejector is rotatably mounted. A flat cover 9' of the magazine 9 has a bore 16 coaxial with bore portions 13 and 14, bore 16 having the same diameter as bore 13. Bores 13 and 16 are so designed that a workpiece W may easily pass through such bores practically without clearance. When the carrier 4 is in its charging position shown in full lines in FIG. 1, bores 13 and 16 are in coaxial alignment with the axis of chuck 2, that is, bores 13 and 16 are coaxial with the working axis. Between the said cover 9' of magazine 9 and the front portion 9 of the magazine and the body 12 respectively, locking tongues 18 having inclined surfaces 19 and suspended by means of leaf springs 17 usually enter into the bore of the magazine outlet between bore portions 16 and 13.

The rear portion of the ejector has an annular groove 20 into which engage screws 22 fixed in arms 21. Arms 21 are fixed in a block 23 pivotably mounted between extensions of the mounting base 8 on a pivot pin 24. An actuating rod 25 rearwardly extending through a window of the mounting base 8 is also attached to block 23. The rod 25 is maintained in a lower end position determined by a stop screw 26 under the action of a spring 25' or in an upper end position determined by a stop screw 29 under the action of a piston 27 when a pressure medium, preferably pressure air is admitted to cylinder 28.

At the side of the canal 1 a locking lever 31 is pivoted on a support 30. The locking lever 31 has a locking block 32 laterally entering into canal 1 through a slit thereof for retaining the lowest workpiece W in canal 1 and thereby preventing workpieces from leaving canal 1, when the lever 31 is urged towards canal 1 by a leaf spring 33. A rivet-shaped cam 34 is fixed on the magazine 9, this cam engaging the right end (FIG. 5) of lever 31 and swinging the lever 31 away from canal 1 thereby allowing workpieces to drop from canal 1 into the magazine, when the magazine is swung to its upper retracted or rest position shown in dash-dotted lines in FIG. 1.

Operation of the illustrated charging device is as follows:

It is assumed that a workpiece has just been worked and has been ejected from chuck 2, whereupon the charging device has been turned round its pivot pin 3 from the said rest position shown in broken lines in FIG. 1 to the charging position shown in full lines in FIG. 1. A number of workpieces W are contained in magazine 9 whereof the lowest, substantially disc-shaped workpiece coaxially lays in the bore portion 13 of the magazine outlet. The tongues 18 entering into the outlet bore prevent this lowest workpiece from leaving the outlet bore 13, 14 due to vibrations of the running machine, that is, the lowest workpiece is secured against axial displacement between tongues 18 and ejector portion 15.

Pressure air is now applied to cylinder 28 by automatic control means not shown and which are not a part of this invention, so that the actuating rod 25 is lifted to its upper end position limited by screw 29, whereby block 23 and arms 21 are rotated in clockwise direction together with the actuating rod 25. The bolts 22 which are axially displaceable in lateral slits of body 12 will thereby displace the ejector to the left in FIG. 2. The workpiece is thereby engaged by the rotatably mounted front portion 15 of the ejector and is discharged through the bores 13 and 16 into the coaxially disposed chuck 2. When the workpiece is ejected and engages the inclined surfaces 19, the locking tongues 18 are outwardly displaced and will allow discharge of the workpiece from the magazine outlet. As soon as the workpiece is inserted into the chuck 2 it will start to rotate with the chuck without being hindered by the ejector portion 15 still engaging it, because ejector portion 15 is rotatably mounted and will rotate together with the workpiece and chuck 2. It is a particular advantage of this invention that the workpiece never requires transport by clamping means such as tongs or the like and may, therefore, be inserted into the rotating workpiece holder, for instance into a chuck of a machine, it being not necessary to stop the machine for charging it with a new workpiece.

When the ejector advances for discharging a workpiece from the magazine and for inserting into the chuck 2, it prevents advance of another workpiece from the canal 11 into the outlet bore portion 13. However, when during the next step of the automatic machine operation, pressure is removed from cylinder 28, all parts controlled by piston 27 will return into the rest position shown in FIG. 2, whereby the ejector is retracted and opens canal 11 so that another workpiece drops into canal portion 13 where it is retained between tongues 18 and the retracted ejector. Simultaneously or subsequently the carrier 4 is swung back into its rest position shown in broken lines in FIG. 1 wherein the inlet of the magazine canal 9, 11 is connected to the outlet of canal 1. Thereby the lever 31 is removed from canal 1 as explained above so that workpieces are allowed to drop from canal 1 into the magazine canal until the magazine is filled. When the charging device has thus been retracted into its rest position, tools may be advanced for working the workpiece. After working of the workpiece the tools are retracted, the workpiece is ejected from chuck 2 and the charging device is advanced into its charging position for insertion of another workpiece into the chuck 2 as explained above.

Of course another kind of magazine may be provided adapted to be advanced into a charging position wherein its outlet is facing the workpiece holder of the machine. As an example a flexible, hose-like magazine or a magazine having a fixed and displaceable portion hinged together may be used instead of the rigid, non-deformable magazine shown in the drawings, whereby the inlet of this flexible magazine is continuously in connection with the outlet of a suitable conveying and orienting device for the workpieces of well known design, for instance with the outlet canal 1 shown in the drawings, whereas the outlet of the magazine may be displaced from a retracted rest position into a charging position, wherein it faces the workpiece holder for discharging a workpiece from the magazine into the workpiece holder. Of course a suitable ejector mechanism would be displaceable with the movable outlet portion of such a flexible magazine. It is of importance that the workpieces fall into the outlet canal of the magazine by gravity at least when the magazine is in its charging position so that no supplemental mechanical means are required for advancing the workpieces through the magazine. However, a simple construction is also possible within the scope of this invention when the workpieces are advanced to the outlet end of the magazine by continuously acting air draught, liquid flow or the like non-positive advancing means.

One further advantage of this invention resides in the fact that the magazine may easily and rapidly be exchanged together with the ejector. Therefore, it is possible to adapt the charging device within a short time for handling different individual workpieces.

Instead of a pneumatic control of the ejector movement the ejector may also be actuated hydraulically or electrically, the common advantage of all these systems being that the ejector control may be effected through flexible conduits or cables arranged between the fixed machine parts and the displaceable charging device.

It may also be within the scope of the invention that the workpieces are non-positively advanced through the magazine by means of an advancing slide or the like, it being of primary importance for this invention that positive or form-closed transport of the workpieces in tongs or holders adapted to the shape of the workpieces is not required. The invention even allows transport of the workpieces into the workpiece holder of the machine, for instance into a chuck as shown in the drawings, without any mechanical transport members. As an example, the workpieces may fall through the magazine by gravity as shown in the drawings and they may be ejected from the canal 13, 14 into the chuck by air pressure acting in the ejecting direction onto the workpiece.

What I claim is:

1. A feeding device for charging a workpiece to a substantially horizontally disposed work holder, comprising a substantially vertical magazine having an inlet near its top and an outlet near its bottom and swingable in its own plane, the magazine being constructed to allow workpieces to gravitate from its inlet to its outlet, means for swingably displacing the said magazine in its own plane which is substantially perpendicular to the axis of the said work holder from a magazine loading position wherein said inlet is positioned to receive workpieces and said outlet is positioned away from the work holder to a charging position wherein the magazine outlet is adjacent to and directly faces the workpiece holder, and ejector means mounted on and displaceable with the said magazine for ejecting a workpiece horizontally from the magazine outlet and inserting the workpiece into the work holder when said magazine is in said charging position.

2. A device according to claim 1 wherein said magazine is rigid and nondeformable, in combination with a conveying apparatus for transporting workpieces to the inlet of the magazine.

3. A device according to claim 1 wherein said ejector means comprises a portion adapted to engage workpieces for ejecting them from the magazine output, the said portion being rotatable around an axis aligned with said axis of the work holder when the magazine is in said charging position.

4. A device according to claim 1 comprising means for swingably displacing the magazine including an oscillatable carrier, the said ejector means and magazine being removably attached to the carrier.

5. A device according to claim 1 wherein said ejector means comprises fluid pressure actuating means mounted on and displaceable with the magazine for operating the said ejecting means.

6. A device as claimed in claim 1 comprising a chute having an outlet, stop means at said chute outlet, an operative condition of said stop means wherein such stop means prevents release of workpieces from the chute outlet, and actuating means attached to said magazine near its said inlet operable to shift said stop means into an inoperative condition for releasing workpieces from the chute outlet whenever the magazine is in its said loading position.

7. A charging device for charging a workpiece to the chuck of a machine tool, said chuck having a horizontal axis, comprising an oscillating carrier rotatable round an axis parallel to the axis of the said chuck, a substantially vertical magazine secured on the said carrier and having an outlet near the bottom of the magazine, ejector means secured on the said carrier and operative to eject workpieces from the said outlet, actuating means for the said ejector means secured on the said carrier, means for rotating the said carrier from an inoperative position to a charging position, the said carrier, magazine, ejector means and actuating means being spaced from the said chuck when the said carrier is in its inoperative position so that the chuck and the workpiece respectively clamped therein are accessible for working, and the said magazine outlet and ejector means being in alignment with the axis of said chuck when the said carrier is in its charging position, whereby a workpiece is ejectable directly from the outlet into the chuck.

References Cited in the file of this patent

UNITED STATES PATENTS

| | | |
|---|---|---|
| 1,508,467 | Novick | Sept. 16, 1924 |
| 1,892,581 | Levine | Dec. 27, 1932 |
| 2,349,456 | Olson | May 23, 1944 |
| 2,572,741 | McCoy | Oct. 23, 1951 |
| 2,687,826 | Hope | Aug. 31, 1954 |
| 2,935,212 | Braun | May 3, 1960 |